United States Patent

[11] 3,624,123

| [72] | Inventors | Roger N. Lewis<br>Pinole;<br>Ronald L. Friedman, San Rafael, both of Calif. |
|---|---|---|
| [21] | Appl. No. | 725,931 |
| [22] | Filed | May 1, 1968 |
| [45] | Patented | Nov. 30, 1971 |
| [73] | Assignee | Argus Chemical Corp.<br>Brooklyn, N.Y. |

[54] T-ALKYL PERESTERS OF T-HYDROPEROXIDES
13 Claims, No Drawings

[52] U.S. Cl. .................................................. 260/453 R,
260/89.1, 260/92.8, 260/93.5, 260/93.7, 260/94.9,
260/610 R
[51] Int. Cl. .................................................. C07c 79/00
[50] Field of Search .......................................... 260/453,
610 D, 610

[56] References Cited
UNITED STATES PATENTS

| 2,450,451 | 10/1948 | Schmerling | 260/453 |
|---|---|---|---|
| 2,497,323 | 2/1950 | Roedel | 260/453 |
| 2,670,384 | 2/1954 | Milas | 260/610 |
| 3,117,166 | 1/1964 | Harrison et al. | 260/453 |
| 3,165,546 | 1/1965 | Merrill | 260/610 |
| 3,214,422 | 10/1965 | Mageli et al. | 260/453 |
| 3,264,274 | 8/1966 | Leveskis | 260/453 |
| 3,297,738 | 1/1967 | Mageli et al. | 260/610 |
| 3,352,926 | 11/1967 | Guillet et al. | 260/610 |
| 3,419,577 | 12/1968 | Bieckert et al. | 260/610 |
| 3,446,831 | 5/1969 | Mageli et al. | 260/610 |

*Primary Examiner*—Lewis Gotts
*Assistant Examiner*—G. Hollrah
*Attorney*—Townsend and Townsend

ABSTRACT: Tertiary alkyl peresters of tertiary hydroperoxides useful as polymerization initiators characterized by the tertiary alkyl group of the acid moiety having at least one alkyl group of two or more carbon atoms. The peresters are particularly efficient in the polymerization of certain vinyl monomers such as vinyl chloride.

T-ALKYL PERESTERS OF T-HYDROPEROXIDES

This invention relates to organic peroxide polymerization initiators. More particularly it relates to certain t-alkyl peresters of t-hydroperoxides and to their use in the polymerization of monomers such as vinyl chloride.

To date all reported work with peresters of the type in which both the acid and hydroperoxide used in the perester synthesis have the tertiary configuration has employed the simplest of the tertiary acids - namely pivalic acid having the structure:

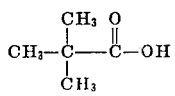

It has now been discovered that when the tertiary or alpha carbon atom of the acid has not more than two methyl groups and preferably no methyl groups bonded thereto, the perester derived from the esterification of such an acid with a tertiary hydroperoxide is an unexpectedly efficient initiator for polymerization reactions. Describing the invention from another viewpoint, the acid used in the esterification may have one or two methyl groups attached to the tertiary carbon atom provided at least one of the three groups on the tertiary carbon atom is an ethyl or larger alkyl group. Preferably all of the groups attached to the tertiary carbon atom of the acid moiety of the perester are ethyl or larger alkyl groups. Particularly outstanding results are obtained where such peresters are used for initiating the polymerization of styrene, vinyl chloride, vinyl acetate, and ethylene.

The peresters of this invention prepared by esterification with a suitable tertiary hydroperoxide such as tertiary butyl hydroperoxide have been found to have significantly shorter half-lives than the corresponding perester formed with pivalic acid and the same hydroperoxide. Of important commercial significance the new peresters provide higher yields of polymer produced therewith and these higher yields are obtained with shorter polymerization times.

In accordance with the present invention the new peresters have the general formula:

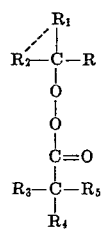

wherein $R_1$ and $R_2$ are alkyl, phenyl, or participate in a cycloalkyl group where shown in broken lines, $R_3$, $R_4$, and $R_5$ are alkyl provided at least one of $R_3$, $R_4$, and $R_5$ contains at least two carbon atoms, and R is selected from the group consisting of alkyl, alkynyl, phenyl, cyclohexyl, and

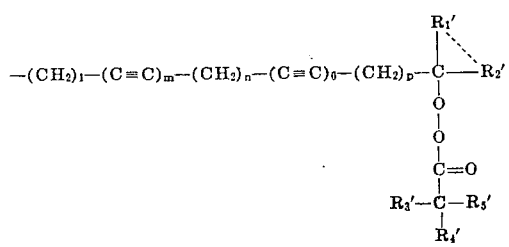

in which $l$, $m$, $n$, $o$, and $p$ are integers from 0–5 provided the sum of $l$, $m$, $n$, $o$, and $p$ is at least $l$, and $R_1'$, $R_2'$, $R_3'$, $R_4'$, and $R_5'$ are each the same as $R_1$, $R_2$, $R_3$, $R_4$, and $R_5$ respectively.

A preferred group of peresters is obtained where R is an alkyl, cyclohexyl, phenyl, or alkynyl group so that a monoperester is provided. A typical example within this category is the case where R, $R_1$ and $R_2$ are all methyl groups. Such peresters are derived by the esterification of tertiary butyl hydroperoxide in accordance with the following general reaction:

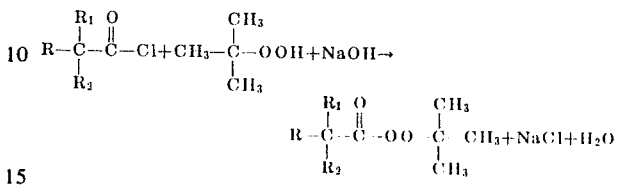

The same reaction is involved where R is an alkynyl, phenyl, or cyclohexyl group. Such perester would be obtained for example where the following hydroperoxide is used instead of the tertiary butyl hydroperoxide shown:

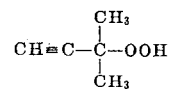

Equally useful hydroperoxides include:
1. 1-Cyclohexyl-1-hydroperoxy ethyne-1
2. 3-Methyl-3-hydroperoxy butyne-1
3. 3-Methyl-3-hydroperoxy pentyne-1
4. 3,5-Dimethyl-3-hydroperoxy hexyne-1
5. 3-Phenyl-3-hydroperoxy butyne-1
6. 3-Phenyl-3-hydroperoxy propyne-1
7. 5-Methyl-3-ethyl-3-hydroperoxy heptyne-1
8. 3-Methyl-3-hydroperoxy decyne-1
9. 3,6-Dimethyl-3-hydroperoxy-heptyne-1
10. 3,5-Dimethyl-3-hydroperoxy hexyne-1
11. 3,4-Dimethyl-3-hydroperoxy pentyne-1
12. 3-Methyl-3-hydroperoxy nonyne-1

All of the above may be used as saturated hydroperoxides if the acetylenic site is hydrogenated in the usual fashion. The foregoing examples are typical of the possible cyclohexyl groups which may occur at R as well as $R_1$ and $R_2$. In general, any alkyl, alkynyl, phenyl, or cyclohexyl group desired is contemplated for R, $R_1$, $R_2$ in which any rings present may contain alkyl substituents. In addition, all of these groups may contain other noninterfering substituents such as halogen atoms as desired. For practical purposes the reactants will generally be selected so that the total perester molecule obtained contains not more than about 50 carbon atoms so that the active oxygen content of the composition will not be too low for commercial purposes.

Instead of a monohydroperoxide, dihydroperoxides are contemplated whereby a diperester is obtained as the end product.

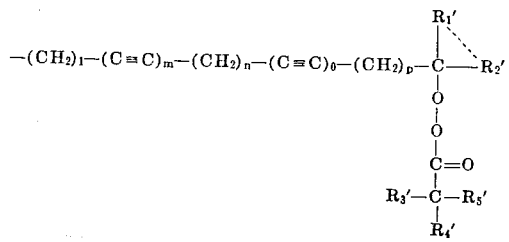

Typical dihydroperoxides which can be used are:
1. 2,5-dimethyl-2,5-dihydroperoxy hexyne-3
2. 2,7-dimethyl-2,7-dihydroperoxy octyne-4
3. 3,4,7,8-tetramethyl-4,7-dihydroperoxy decyne-5
4. 4,7-dimethyl-4,7-dihydroperoxy decyne-5
5. 3,6-diethyl-3,6-dihydroperoxy octyne-4
6. 3,4-dimethyl-3,4-dihydroperoxy pentyne-1

Where a dihydroperoxide is used as a starting reactant in the esterification reaction given previously, twice the amount of acid halide is used for esterifying the two available sites. A preferred saturated dihydroperoxide for use in this invention is 2,5-dimethyl-2,5-dihydroperoxyhexane. Additional saturated dihydroperoxides useful in this esterification reaction for preparing the present compounds are described in the preparation of diperesters in U.S. Pat. No. 3,264,274.

Additional useful acetylenically unsaturated dihydroperoxides useful in preparing the present peresters are more fully described in connection with the peresters of copending patent application, Ser. No. 531,352 filed Mar. 3, 1966, now abandoned. A number of patents describe the use of dihydroperoxides having more than one acetylenic site.

The selected tertiary hydroperoxide is reacted with any alkanoic acid halide (or anhydride) providing the alpha carbon atom of the acid halide is tertiary and contains not more than two methyl groups. These acid halides are derived from acids commonly referred to as "neo"-acids which term implies that the alpha carbon atom of the acid is fully substituted with alkyl groups. A series of typical neoacids useful in this invention will be illustrated hereinafter. In the preferred embodiment, all of the acids contain alkyl groups although noninterfering substituents could be present on the alkyl groups. As used herein the term "alkyl" should be construed in the broadest sense to include hydrocarbon groups as well as substituted alkyl groups.

A series of examples are described below to illustrate the invention. The examples make use of the neoacids listed in the following table in preparing the new peresters. As will be seen from the table, the acids employed are a mixture of isomers (except the pivalic acid used as a control for comparison) including some molecules having one or two methyl groups on the tertiary carbon atom. In all cases the end product perester mixture obtained therefrom has the desired advantageous properties by virtue of the presence of at least one group on the tertiary carbon atom having 2 or more carbon atoms.

TABLE I

| Neo-acid | Total No. carbon atoms | Supplier | Isomer distribution, percent wt.[1] | | |
|---|---|---|---|---|---|
| | | | α-Dimethyl | α-Methyl-alkyl [3] | α-Dialkyl [4] |
| 1. Pivalic | 5 | Shell Chem. Co | 99+ | | |
| 2. Neoheptanoic | 7 | Enjay Chem. Co | 95 | 5 [5] | |
| 3. Neooctanoic | 8 | do | 39 | 61 | |
| 4. Neononanoic | 9 | Shell Chem. Co | 56 | 27 | |
| 5. Neodecanoic [2] | 10 | Enjay Chem. Co | 25±5 | 60±10 | 15±10 |
| 6. Neotridecanoic | 13 | do | 25±5 | 60±10 | 15±10 |

[1] Information taken from supplier data sheets.
[2] A recent publication: M. Fefer and A. J. Rutkowski, J. Amer. Oil Chem. Soc., 45, 5 (1968) gives the isomer distribution of this neo-decanoic acid as:
α-dimethyl ........................................................................................ 31±5
α-methyl-alkyl .................................................................................. 67±10
α-dialkyl ........................................................................................... 2±10
[3] One methyl group plus one larger alkyl group.
[4] Two alkyl groups larger than the methyl group.
[5] Methyl-ethyl.

In order to prepare the peresters of this invention, it is advantageous to first convert the selected neoacid to an acid halide. A typical experimental procedure for this purpose is as follows:

EXAMPLE I

Neodecanoyl Chloride

The reaction is run in a 1-neck round-bottom flask equipped with a J-tube having a thermometer and a condenser with a drying tube. Stirring is done with a magnetic stirring bar.

75.0 g. of $PCl_3$ (0.55 mole, equal to 25 mole percent excess) is added quickly from a separatory funnel through the condenser to 225.3 g. (1.31 moles) of Enjay neodecanoic acid being stirred at 20° C. The mixture is warmed to 65° C. in about 20 minutes and maintained at this temperature for 2½ hours. Then the heating and stirring are stopped, and the mixture is allowed to cool to room temperature. After separation from the phosphorous acid layer, the acid chloride is stripped under 20–75 mm. pressure at about 50° C. The finished acid chloride weighed 249.2 g. (249.8 g. theoretical for 100 percent conversion and purity) and can be used without further purification.

This example illustrates a reaction procedure which can be used to prepare acid chlorides from all of the neoacids shown in table I, with the only modification being that the stripping may be done at a lower temperature depending upon the boiling point of the acid chloride.

Using any desired neoacid halide the following peresters are typical of the invention. In the formulas, the structure of $R_3$, $R_4$ and $R_5$ will depend upon the neoacid halide selected.

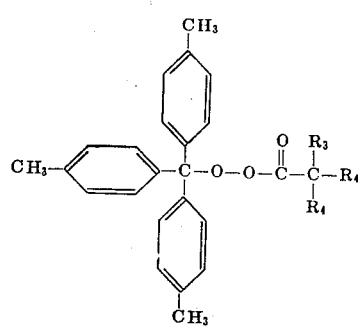

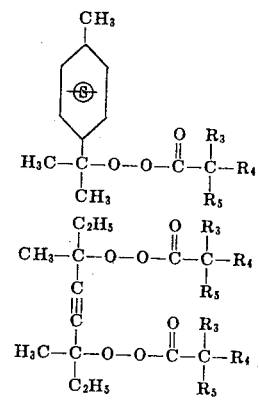

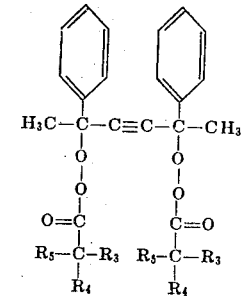

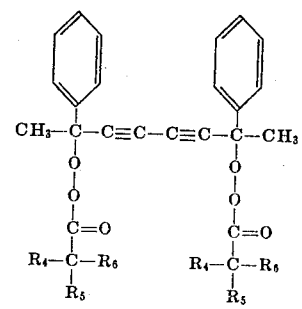

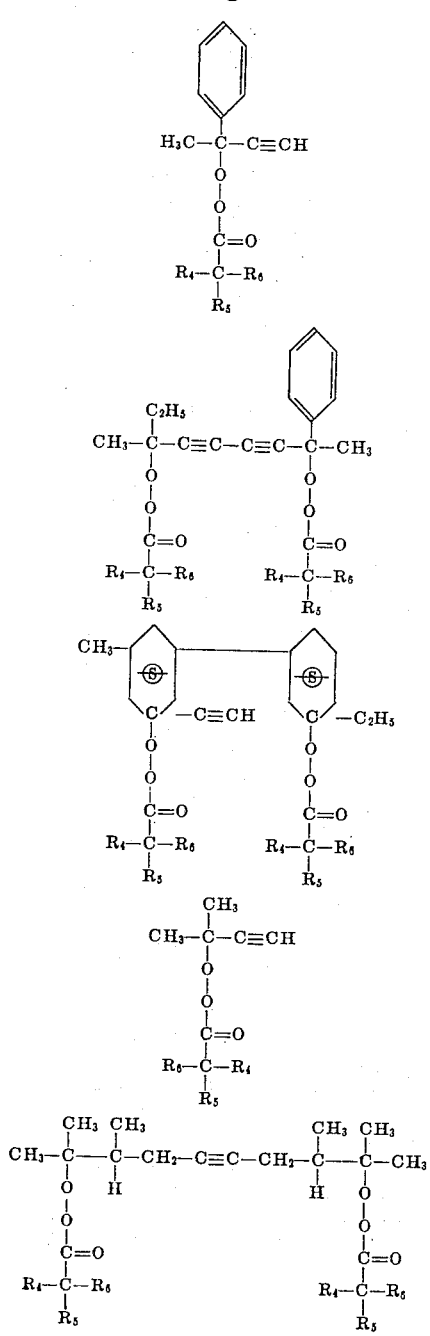

To further illustrate the invention, a series of tertiary butyl peresters were prepared from the acid halides of each of the neoacids of table I. The following procedure is typical of the process used for perester formation.

EXAMPLE II t-Butyl Peroxyneoheptanoate

To a stirred mixture of 34 ml. water, 16 ml. of tertiary butyl alcohol (TBA), and 15.29 g. (0.191 mole) of 50 percent NaOH, 9.14 g. (0.099 mole) of 97.55 percent tertiary-butyl hydroperoxide (TBHP) was added slowly in 2 minutes at 20°–25 C. Then 19.11 g. (0.1286 mole) of vacuum-stripped neoheptanoyl chloride was added dropwise to the vigorously stirred reaction mixture in 20 minutes at 20°–25° C. The reaction mixture was warmed to 50° C. in about 15 minutes and held at 50° C. for 30 minutes. Then about 100 ml. ice $H_2O$, 0.5 g. NaCl, and 25 ml. ether were added to the reaction mixture; it is stirred about 1–2 minutes and allowed to phase separate.

The organic layer is washed two times with 40 ml. of cold 1–2 percent aqueous KOH solution and two times with 40 ml. of cold tap water containing a little NaCl. Then the organic layer is dried with anhydrous $Na_2SO_4$, filtered through a layer of anhydrous $MgSO_4$, and concentrated under vacuum using a 10° C. water bath. Product A.O. Analysis: Theory, 7.91; Found, 7.67, 97.03 percent pure; 76.1 percent yield.

All of the other peresters are formed by substantially the same procedure by substituting the appropriate acid halide for the neoheptanoyl chloride of this example.

As already mentioned, the peresters of this invention have significantly shorter half-lives than the related peresters previously described in the literature. In general, shorter half-lives mean faster reaction times and this is of value from a commercial standpoint. Some typical half-life data of peresters of this invention as compared with the previously known pivalic perester is provided in the following table:

TABLE II.—HALF-LIFE DATA, HOURS

| Initiator | Tempreature, ° C. | | | |
|---|---|---|---|---|
| | 40 | 50 | 60 | 70 |
| 1. t-butyl peroxypivalate | 84 | 19.9 | | 1.6 |
| 2. t-butyl peroxyneooctanoate | | 8.4 | 2.3 | 0.67 |
| 3. t-butyl peroxyneodecanotate | | 8.0 | 2.3 | 0.72 |

Example II is concerned with the synthesis of monoperesters provided by this invention. The following examples III, IV, and V illustrate the preparation of typical diperesters of this invention.

EXAMPLE III 2,7-Dimethyl Octane-2,7-Diperneodecanoate

To a stirred mixture of 50 ml. water, 5 drops of Triton X–100 emulsifier, and 16.0 g. (0.200 mole) of 50 percent NaOH, 7.8 g. (0.0366 mole) of 96.7 percent 2,7-dimethyl-2,7-dihydroperoxy octane was added while maintaining the temperature at about 25° C. The reaction mixture was then warmed to 40° C., and 24.7 g. (0.130 mole) of neodecanoyl chloride was added to the vigorously stirred reaction mixture in 5 minutes at 40° C. The reaction mixture is held at 40° C. for an additional 3½ hours. Then the product is isolated in the same manner as described in example II, except n-hexane was used, rather than ether. Product A.O. analysis: Theory, 6.22; Found, 6.22, 100.0 percent pure; 65.1 percent yield.

EXAMPLE IV 2,5-Dimethyl Hexane-2,5-Diperneononanoate

To a stirred mixture of 13 ml. water, 50 ml. TBA, 10 drops Triton X–100 emulsifier, and 12.5 g. (0.156 mole) 50 percent NaOH, 5.7 g. (0.03 mole) of 94.3 percent 2,5-dimethyl-2,5-dihydroperoxy hexane was added while maintaining the temperature at about 24° C. Then 18.6 g. (0.105 mole) of neononanoyl chloride is added dropwise to the vigorously stirred reaction mixture in 22 minutes at 27° C. The reaction mixture is warmed to 50° C. in 7 minutes and maintained at 50° C. for 53 minutes. Then the product is isolated in the same manner as described in example II, except petroleum naphtha was used, rather than ether. Product A.O. analysis: Theory, 6.98; Found, 6.41, 91.8 pure; 67.4 percent yield.

EXAMPLE V 2,5-Dimethyl Hexane-2,5-Diperneoheptanoate

To a stirred mixture of 500 ml. water, 75 drops of Triton X–100 emulsifier, and 590.0 g. (7.37 moles) of 50 percent NaOH, 156.7 g. of 94.3 percent 2,5-dimethyl-2,5-dihydroperoxy hexane was added at 14° C. The reaction mixture was cooled to 0° C. Then 443.3 g. (2.50 moles) of neoheptanoyl chloride was added to the vigorously stirred reaction mixture in 34 minutes while maintaining the temperature at 0°–5° C. Then the reaction was allowed to warm to 19° C. in 47 minutes and maintained between 19°–22° C. for an additional 95 minutes. Then the product is isolated in the same manner as described in example II, except petroleum naphtha was used, rather than ether. Product A.O. analysis: Theory, 7.95; Found, 7.38, 92.8 percent pure; 62.2 percent yield.

The peresters of this invention are most advantageously used for the polymerization of styrene, vinyl chloride, vinyl acetate, and ethylene. Typical of the benefits of the new peresters is illustrated by the polymerization of vinyl chloride. The peroxides listed in table III below were prepared by the methods just described (purity and yield are given in table III) and were used to initiate the polymerization of vinyl chloride to make polyvinyl chloride (PVC).

Comparisons were made between the monoperesters of this invention and t-butyl peroxypivalate on both an equal weight and equal molar basis when used for the polymerization of vinyl chloride. Similarly, a typical diperester of this invention was compared with a corresponding diperoxypivalate on both an equal weight and equal molar basis. In the case of the monoperesters the peroxide was added to the vinyl chloride monomer to comprise 0.03 percent by weight or $8.61 \times 10^{-5}$ moles thereof. In the case of the diperesters, additions to the monomer were made to comprise 0.03 percent by weight or $4.329 \times 10^{-5}$ moles thereof.

The polymerization procedure used is as follows: Into 6½ fluid ounce Coke bottle, containing 94.0 g. of frozen dispersing solution, were added the appropriate amount of peroxide and 50.0 g. of vinyl chloride monomer. The Coke bottle was capped, the contents almost melted, and then the bottle is placed in a rotating constant temperature bath for 6 hours at 50±2° C. After the bottle was cooled, and the excess monomer vented, the PVC was filtered, washed, and dried at 40°–50 C. for 12–16 hours. The results are shown in table III.

The foregoing experimental data was obtained with t-butyl peresters of appropriate acids. The t-butyl group was selected because of the widely used and commercially available t-butyl hydroperoxide used in the preparation of the peresters. However, equivalent results are obtained with the other types of peresters of this invention formed with hydroperoxides other than t-butyl hydroperoxide. To illustrate the scope of the invention contemplated, α-cumyl peroxyneodecanoate was selected to typify the use of aryl hydroperoxides in making the peresters. 1,1'-dicyclohexyl acetylene-1,1'-diperoxyneodecanoate illustrates the presence of acetylenic and cycloalkyl groups in the hydroperoxide. The following work provides details of the synthesis of these peresters and the advantages in use as polymerization initiators. Again, the corresponding pivalate perester is used for comparison.

EXAMPLE VI 1,1'-Dicyclohexyl Acetylene-1,1'-Diperoxypivalate

To a stirred mixture of 18½ ml. water, 18 ml. t-butyl alcohol, and 9.67 g. (0.1209 mole) of 50 percent NaOH, 6.55 g. (0.0237 mole) of 92.0 percent 1,1'-dicyclohexyl-1,1'-dihydroperoxy acetylene was added at 20° C. in 8 minutes to form a thick slurry. Then 8.58 g. (0.0711 mole) of pivaloyl chloride was added to the vigorously stirred reaction mixture in 10½ minutes at 20°–28° C. The reaction mixture is warmed to 50° C. in about 15 minutes and held at 50° C. for 30 minutes. Again, the product is isolated in the same manner as described in example II, except isohexane was used, rather than ether. Product A.O. analysis: Theory, 7.57; Found, 6.49, 85.8 percent pure; 50.5 percent yield.

TABLE III

| Peroxide | Synthesis results | | Utility as an initiator for vinyl chloride | | |
|---|---|---|---|---|---|
| | | | Avg. PVC yield, g. | | |
| | Percent purity | Percent yield | With equal wt. initiator | With equal moles initiator | Avg. PVC yield, percent |
| 1. t-butyl peroxypivalate | 95.75 | 68.8 | 7.3 | | 14.6 |
| 2. t-butyl peroxyneoheptanoate | | | (a) 13.45 | | 26.9 |
| | | | (b) | 15.55 | 31.1 |
| 3. t-butyl peroxyneooctanoate | 89.12 | 56.8 | (a) 16.7 | | 33.4 |
| | | | (b) | 18.75 | 37.5 |
| 4. t-butyl peroxyneononanoate | 90.82 | 46.8 | (a) 14.9 | | 29.8 |
| | | | (b) | 19.5 | 39.0 |
| 5. t-butyl peroxyneodecanoate | 90.84 | 68.1 | (a) 17.5 | | 35.0 |
| | | | (b) | 21.9 | 43.8 |
| 6. t-butyl peroxyneotridecanoate | 83.72 | 58.2 | (a) 15.0 | | 30.0 |
| | | | (b) | 23.4 | 46.8 |
| 7. 2,5-dimethylhexane-2,5-diperoxypivalate | 100.00 | 73.0 | 7.65 | | 15.3 |
| 8. 2,5-dimethylhexane-2,5-diperoxyneodecanoate | 87.26 | 77.5 | (a) 16.3 | | 32.6 |
| | | | (b) | 22.1 | 44.2 |

With respect to the results shown in table III, it is to be noted that the monoperesters of this invention containing a tertiary carbon atom having not more than one methyl group attached thereto are substantially more efficient in terms of polymer yield than the control peroxypivalate perester. Similarly, the diperester of this invention is more efficient than the control pivalate diperester.

In addition to efficiency in terms of increased yield, the peresters of this invention provide an additional advantage in speed of polymer formation. Using peroxide initiators to comprise 0.05 percent weight of vinyl chloride monomer, the same procedure used in obtaining the data shown in table III was again employed with the peresters shown in table IV below. The percent yield of polyvinyl chloride polymer was monitored with respect to time. The results are as follows:

TABLE IV.—YIELD OF PVC VERSUS TIME—0.05% WT. INITIATOR AT 50±2° C.

(Percent weight PVC yield)

| Initiator | Time, hours | | | | | |
|---|---|---|---|---|---|---|
| | 2 | 4 | 6 | 8 | 10 | 12 |
| 1. t-Butyl peroxypivalate | 5.8 | 15.8 | 28.2 | 43.3 | 59.4 | 76.0 |
| 2. t-Butyl peroxyneooctanoate | 13.0 | 34.8 | 60.8 | 81.2 | 86.0 | 87.8 |
| 3. t-Butyl peroxyneodecanoate | 11.4 | 29.8 | 50.6 | 72.4 | 83.0 | 86.0 |

EXAMPLE VII 1,1'-Dicyclohexyl Acetylene-1,1'Diperoxyneodecanoate

Following the procedure of example VI but substituting neodecanoyl chloride for the pivaloyl chloride therein, 1,1'-dicyclohexyl acetylene-1,1'-diperoxyneodecanoate was obtained in a yield of 64.8 percent and a purity of 72.9 percent.

The general formula of this perester is:

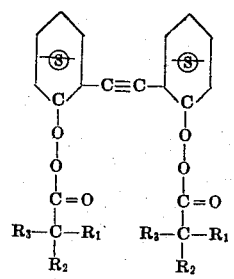

EXAMPLE VIII

α-Cumyl Peroxypivalate and α-Cumyl Peroxyneodecanoate

Peresters of the general formula:

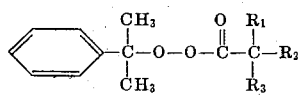

were prepared in accordance with the process described in example II by reacting cumene hydroperoxide with pivaloyl chloride to form α-cumyl peroxypivalate in a yield of 76.1 percent and a purity of 86.5 percent. Similarly, cumene hydroperoxide and neodecanoyl chloride were reacted to form α-cumyl peroxyneodecanoate in a yield of 71.6 percent and purity of 81.6 percent.

The peresters of examples VI, VII and VIII together with t-butyl peroxypivalate were used as initiators for the polymerization of vinyl chloride monomer. The results are shown in table V below.

The data in table V was obtained by employing all the pivalate and the neodecanoate peresters on an equal weight concentration with respect to the monomer of 0.03 percent by weight. Comparison was also made on an equal mole basis using $6.35 \times 10^{-5}$ moles of the α-cumyl peresters (equal to 0.03 percent wt. of α-cumyl peroxypivalate) and using $3.55 \times 10^{-5}$ moles of the 1,1'-dicyclohexyl acetylene peresters (equal to 0.03 percent by weight of 1,1'-dicyclohexyl acetylene-1,1'-diperoxypivalate). Polymerization conditions were 6 hours at about 52° C. using the same general procedure described in connection with table III. The higher yields obtained with t-butyl peroxypivalate in table V are due to the use of a higher polymerization temperature than before. The results shown in table V again illustrate the unexpected advantages obtained with the peresters of this invention.

TABLE V

Utility as an initiator for vinyl chloride

| Peroxide | Avg. PVC yield, g. | | Avg. PVC yield, percent |
|---|---|---|---|
| | With equal wt. initiator | With equal moles initiator | |
| 1. t-Butyl peroxypivalate. | 11.3 | | 22.6 |
| 2. α-Cumyl peroxypivalate. | 18.75 | | 37.5 |
| 3. α-Cumyl peroxyneodecanoate. | (a) 21.25 | | 42.5 |
| | (b) | 37.1 | 74.2 |
| 4. 1,1'-dicyclohexyl acetylene-1,1'-diperoxypivalate. | 16.25 | | 32.5 |
| 5. 1,1'-dicyclohexyl acetylene-1,1'-diperoxyneodecanoate. | (a) 14.65 | | 29.3 |
| | (b) | 17.35 | 34.7 |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An organic peroxide of the formula:

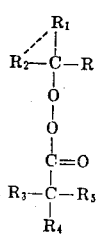

wherein $R_1$ and $R_2$ are alkyl, phenyl, or participate in a cyclohexyl group where shown in broken lines, $R_3$, $R_4$, and $R_5$ are alkyl provided not more than one of $R_3$, $R_4$ and $R_5$ is methyl, and R is selected from the group consisting of alkyl, alkynyl, phenyl, cyclohexyl, and

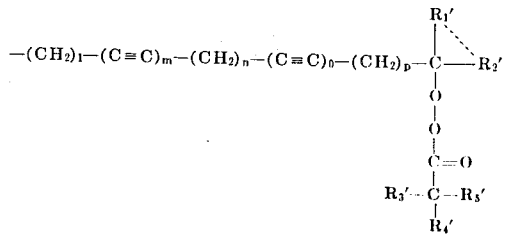

in which $l$, $m$, $n$, $o$, and $p$ are integers from 0–5 provided the sum of $l$, $m$, $n$, $o$, and $p$ is at least $l$, and $R_1'$, $R_2'$, $R_3'$, $R_4'$, and $R_5'$ are each the same as $R_1$, $R_2$, $R_3$, $R_4$, and $R_5$, respectively, said peroxide having up to 50 carbon atoms, and further provided that when R is alkyl, alkynyl, phenyl or cyclohexyl, each of R, $R_1$ and $R_2$ have up to about 7 carbon atoms and each of $R_3$, $R_4$ and $R_5$ have up to about 8 carbon atoms, each of $R_1'$ and $R_2'$ have up to about 7 carbon atoms and each of $R_3'$, $R_4'$, and $R_5'$ have up to about 8 carbon atoms.

2. An organic peroxide in accordance with claim 1 wherein R, $R_1$ and $R_2$ are alkyl groups.

3. An organic peroxide in accordance with claim 1 wherein R is:

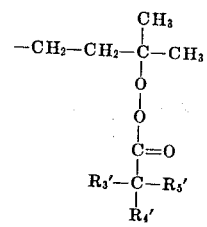

and wherein $R_1$ and $R_2$ are methyl groups.

4. An organic peroxide in accordance with claim 2 wherein R, $R_1$ and $R_2$ are methyl groups.

5. An organic peroxide in accordance with claim 1 wherein $R_3$, $R_4$ and $R_5$ each have at least 2 carbon atoms.

6. An organic peroxide in accordance with claim 1 wherein R, $R_1$, $R_2$ are methyl groups and $R_3$, $R_4$ and $R_5$ collectively contain a total of 5 carbon atoms.

7. An organic peroxide in accordance with claim 1 wherein R, $R_1$, $R_2$ are methyl groups and $R_3$, $R_4$ and $R_5$ collectively contain a total of 6 carbon atoms.

8. An organic peroxide in accordance with claim 1 wherein R, $R_1$, $R_2$ are methyl groups and $R_3$, $R_4$ and $R_5$ collectively contain a total of 7 carbon atoms.

9. An organic peroxide in accordance with claim 1 wherein R, $R_1$ $R_2$ are methyl groups and $R_3$, $R_4$ and $R_5$ collectively contain a total of 8 carbons atoms.

10. An organic peroxide in accordance with claim 1 wherein R, $R_1$, $R_2$ are methyl groups and $R_3$, $R_4$ and $R_5$ collectively contain a total of 11 carbon atoms.

11. An organic peroxide in accordance with claim 1 wherein R is:

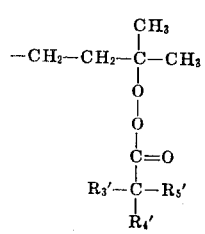

and wherein $R_1$ and $R_2$ are methyl groups.

12. An organic peroxide in accordance with claim 1 wherein $R_1$ and $R_2$ are methyl groups and R is a phenyl group.

13. An organic peroxide in accordance with claim 2 wherein $R_3$ is methyl and $R_5$ is ethyl.

* * * * *